No. 882,599. PATENTED MAR. 24, 1908.
W. A. WEANT.
TRIPLE VALVE.
APPLICATION FILED DEC. 16, 1907.
2 SHEETS—SHEET 2.
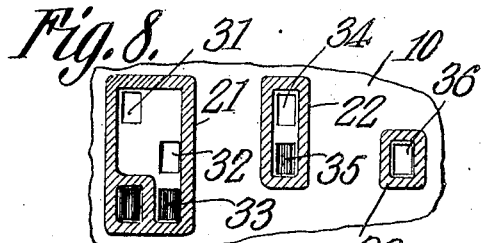
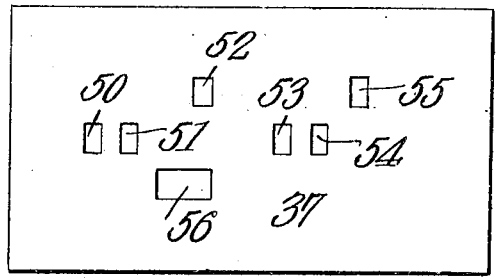
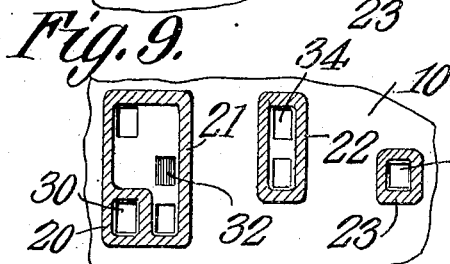
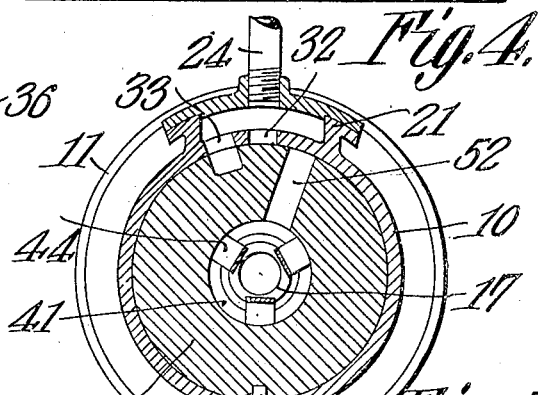
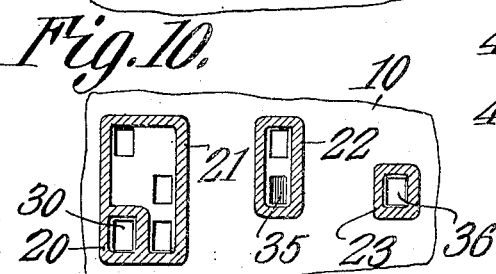
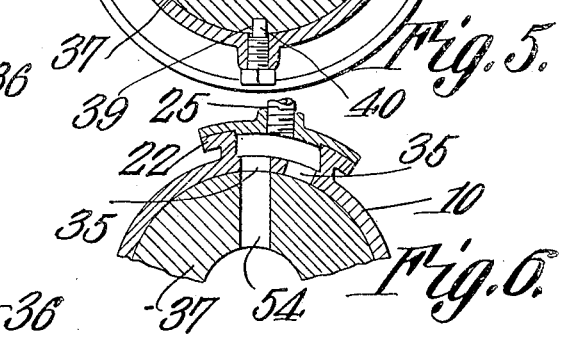
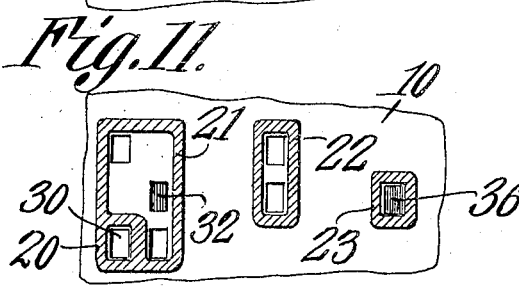
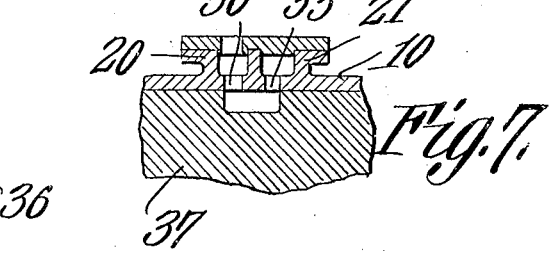
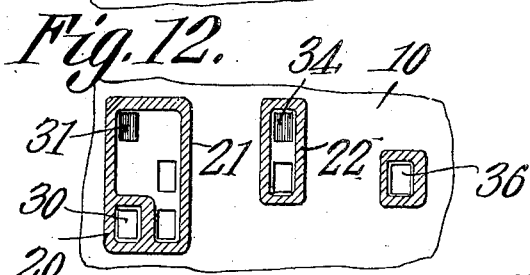
Witnesses
Inventor
William A. Weant.
By C. A. Snow & Co.
Attorneys

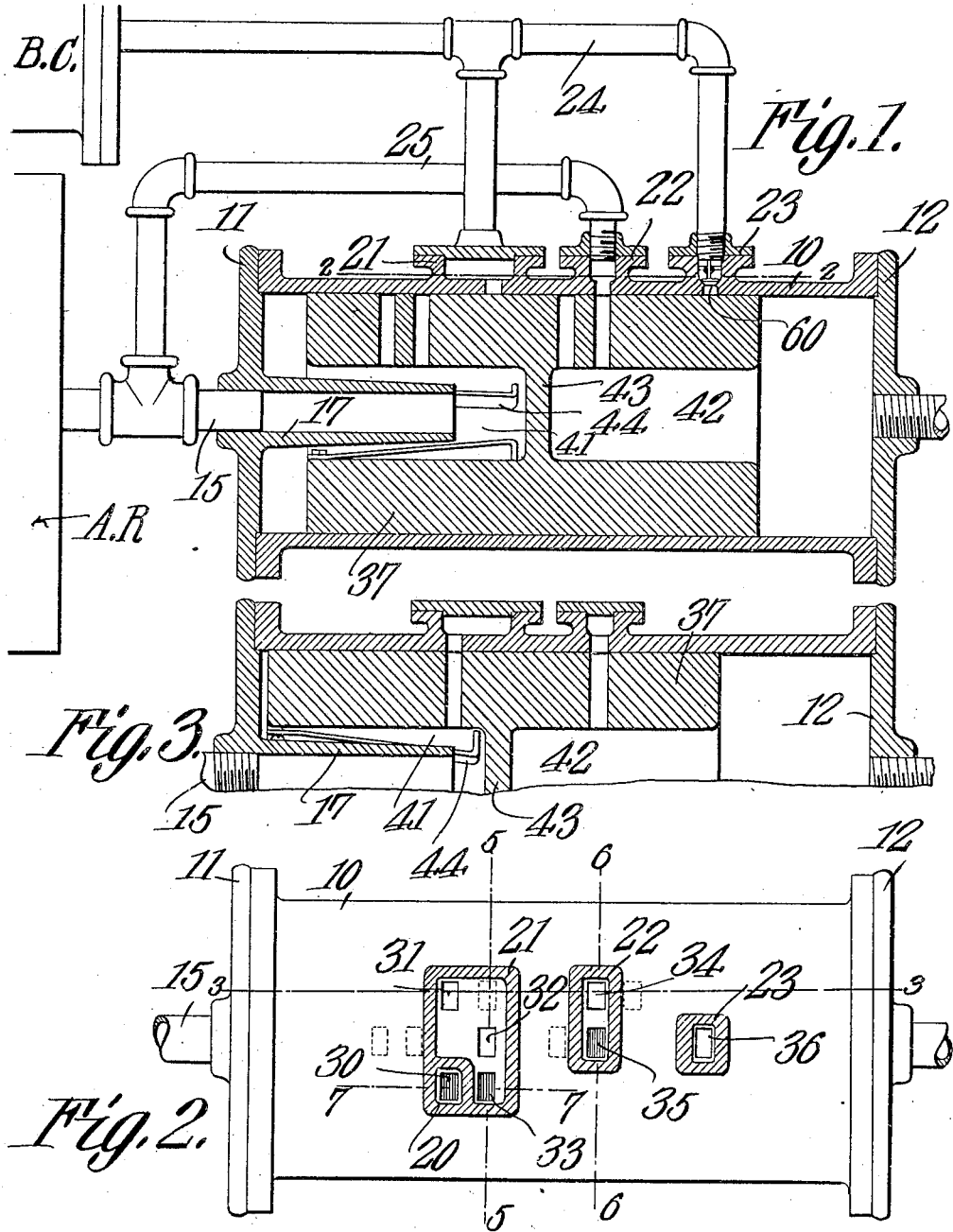

UNITED STATES PATENT OFFICE.

WILLIAM A. WEANT, OF MOCKSVILLE, NORTH CAROLINA.

TRIPLE VALVE.

No. 882,599.  Specification of Letters Patent.  Patented March 24, 1908.

Application filed December 16, 1907. Serial No. 406,732.

*To all whom it may concern:*

Be it known that I, WILLIAM A. WEANT, a citizen of the United States, residing at Mocksville, in the county of Davie and State of North Carolina, have invented a new and useful Triple Valve, of which the following is a specification.

This invention relates to air brakes, and has for its principal object to provide a novel form of controlling valve to take the place of the well known triple valves of the Westinghouse and New York air brake systems.

A further object of the invention is to provide an air brake in which the valve is perfectly balanced, so that there will be no undue wear between the valve and its seat due to the pressure of the air on the back of the valve.

A still further object of the invention is to provide a novel form of valve in which provision is made for replenishing the supply of air of the auxiliary reservoir while the brakes are set, it being unnecessary to move the valve to release position before restoring the auxiliary reservoir pressure.

A still further object of the invention is to provide a novel form of valve in which air passes from both the auxiliary reservoir and the train pipe on an emergency application, and further, to provide means for preventing the passage of the auxiliary reservoir air to the atmosphere in case of parting of the train, and the consequent opening of the train pipe, the valve in this case moving to emergency position, and air from the auxiliary reservoir passing to the brake cylinder.

A still further object of the invention is to provide a valve mechanism in which provision is made for an additional valve movement to brake applying position, so that in case of emergency, the engineer may suddenly raise the train pipe pressure by connection with the main air reservoir of the locomotive and move all of the valves to such position that the high pressure air of the train pipe will pass through the valve direct to the auxiliary reservoir, while the auxiliary reservoir will be placed in communication with the brake cylinder, so that as fast as the air flows from the reservoir, it will be replenished at the same, or at greater pressure from the train pipe.

Further objects and advantages will appear in the following description, it being understood that various changes in the form, proportions, size and minor details of the structure may be made without departing from the spirit or sacrificing any of the advantages of the invention.

In the accompanying drawings:—Figure 1 is a sectional elevation of an air brake mechanism constructed in accordance with the invention. Fig. 2 is a sectional plan view on the line 2—2 of Fig. 1. Fig. 3 is a longitudinal sectional view of the upper portion of the cylinder and valve on the line 3—3 of Fig. 2 with the piston moved in the direction of the air-reservoir. Fig. 4 is a plan view of the valve detached. Fig. 5 is a transverse section on the line 5—5 of Fig. 2. Fig. 6 is a similar view on the line 6—6 of Fig. 2. Fig. 7 is a longitudinal sectional view on the line 7—7 of Fig. 2. Fig. 8 is a diagram of the casing ports when the valve is in the normal brake releasing position, the active ports, or those which are in alinement with corresponding valve ports, being shaded. Fig. 9 is a similar diagram showing the position in making a service application, the single active port being shaded. Fig. 10 is a similar diagram showing the position assumed in recharging the auxiliary reservoir while the brakes are set, the active port being shaded and the remaining ports blank. Fig. 11 is a similar diagram showing the emergency position when air flows from both the auxiliary reservoir, and the train pipe to the brake cylinder, the active ports being shaded and the remaining ports blank. Fig. 12 is a diagram showing the position assumed when the valve is moved under excess pressure in the train pipe, so as to place the train pipe, auxiliary reservoir and brake cylinder in serial connection, the active ports being shaded and the remaining ports blank.

Similar numerals of reference are employed to indicate corresponding parts throughout the several figures of the drawings.

In carrying out the invention, all of the parts of the train equipment, except the triple valve may be of the usual construction and the drawing shows a conventional form of auxiliary reservoir A R and brake cylinder B C.

The valve casing 10 is cylindrical in form, and is provided with removable heads 11 and 12, the head 11 being connected by a pipe 15 to the auxiliary reservoir and the head 12 being coupled to the train pipe. The head 11 carries an inwardly extending tubular stem 17, through which the auxiliary reservoir air passes to the interior of the cylinder, and this stem is utilized in the manner hereinafter described for the purpose of assisting in stopping the movement of the main valve at the proper point.

Projecting from the top or side of the cylinder, are the walls of four chambers 20, 21, 22 and 23, the two casings 21 and 23 being connected together by a pipe 24 which leads to the brake cylinder. The casing 22 is connected by a pipe 25 to the pipe 15, and auxiliary reservoir. The casing 20 may be open, or may be provided with a suitable discharge pipe, placing it in communication with the outer air, this casing constituting an exhaust from the brake cylinder.

Extending through the wall of the cylinder are a number of ports which are divided among the several casings or chambers, the casing 20 having an exhaust port 30; the casing 21 having three ports 31, 32 and 33; the casing 22 having two ports 34 and 35, and the casing 23 having a single port 36. All of these ports lead through the wall of the cylinder, and are under the control of the piston valve 37 in said cylinder.

The piston valve 37 is cylindrical in form, and is carefully turned and finished in order to fit closely within the cylinder, the fit being such as to permit ready movement of the valve within the cylinder, while at the same time preventing leakage of air. As it is necessary to hold the valve from rotative movement, any simple means for accomplishing this result may be employed, and in the present instance the valve is shown as provided with a longitudinal groove 39 which receives the unthreaded end of a screw 40 that is mounted in a threaded opening formed in a boss on the cylinder.

Both ends of the valve 37 are bored out to form two cylindrical chambers 41 and 42, that are separated from each other by a transverse partition 43. The bore 41 receives the hollow stem 17, and in this bore are arranged pins 44 that engage with the stem and prevent movement of the valve beyond brake releasing position under ordinary circumstances, but in case of excess pressure in the train pipe, such pressure acting on the train pipe end of the valve will move the latter against the resistance offered by the spring to such position as to apply the brake from auxiliary reservoir pressure, and at the same time open communication between the train pipe and the auxiliary reservoir. One end of the valve is at all times exposed to auxiliary reservoir pressure, and the other end to train pipe pressure, and when the latter pressure is reduced or increased by movement of the engineer's brake valve in the usual manner, the valve is moved for the purpose of making a service application or an emergency application, or for releasing the brakes, and in addition to this, the valve may be moved to a position to effect recharging of the auxiliary reservoir, while the brakes are set, as will hereinafter appear.

In the valve are arranged three ports 50, 51 and 52, that communicate with the bore 41 and hence with the auxiliary reservoir, and there are, also, three ports 53, 54 and 55 which communicate with the bore 42, and hence with the train pipe. In the periphery of the valve there is, also, an exhaust cavity 56, for the purpose of placing the ports 30 and 33 of the cylinder in communication with each other and allowing the brake cylinder to exhaust to the atmosphere.

In the normal position of the parts, the valve cavity 56 is in communication with the ports 30 and 33, so that the brake cylinder is open to the exhaust, while the port 54 of the valve is in communication with the port 35 of the cylinder, so that air is passing from the train pipe to the auxiliary reservoir, this being the position normally assumed in both the Westinghouse and New York air brake systems. When a service reduction is made for the application of the brakes, the superior pressure at the auxiliary reservoir end of the valve will move the latter to such position as to blank all of the ports, with the exception of the port 51 of the valve, and the port 32 of the cylinder, thereby establishing communication between the auxiliary reservoir and the brake cylinder, and making a service application of the brake. If the engineer then desires to recharge the auxiliary reservoir without releasing the brakes, he gradually increases the pressure in the train pipe, so as to move the valve against the auxiliary reservoir, and in this position port 53 is placed in communication with the cylinder port 35, so that air will feed from the train pipe to the auxiliary reservoir, and at the same time cutting off communication between the auxiliary reservoir and the brake cylinder, so as to hold the brakes. By again reducing the pressure in the train pipe, the valve may be again moved for another service application, or for increasing the charge in the brake cylinder, or the pressure may be increased in the train pipe for the purpose of restoring the valve to the initial position and allowing the brakes to release.

On an emergency reduction in the train pipe, the valve moves quickly to such position that the port 54 of the valve communicates with the port 36 of the cylinder, thereby allowing air to flow directly from the train pipe to the brake cylinder, and at the same time the port 50 of the valve moves into alinement with the port 32 of the cylinder, thereby opening communication between the auxiliary reservoir and the brake cylinder, so that the latter is supplied with air from both the train pipe and the auxiliary reservoir for an emergency stop.

Should the train break in two, the reduction of train pipe pressure is such that the valve will of course move to emergency position, and as in this position the train pipe is in communication with the brake cylinder and hence with the auxiliary reservoir, the auxiliary reservoir pressure will naturally vent through the open train pipe without applying the brakes. In order to prevent this, a one way check valve 60 is arranged in the casing 23, so that while air can pass upward through the port 36 to pipe 24 and brake cylinder, it is impossible for the air to flow backward from the brake cylinder and down through the port to the train pipe.

Under certain circumstances, it may be desirable to apply the brakes without reducing the auxiliary reservoir pressure, and in the present case provision is made for accomplishing this result by increase in pressure in the train pipe.

By moving the engineer's brake valve, the train pipe will be placed in full communication with the main air reservoir on the engine, and this superior pressure will move the valves against the resistance offered by the auxiliary reservoir pressure until the port 52 of the valve is placed in communication with the port 31 of the cylinder, thereby establishing communication from the auxiliary reservoir to the brake cylinder. At the same time the port 55 of the valve is moved into alinement with the port 34 of the cylinder, and thereby establishing communication between the train pipe and the auxiliary reservoir, so that the train pipe, the auxiliary reservoir, and the brake cylinder are connected in series in the order named, and the auxiliary reservoir pressure augmented by the increased train pipe pressure will flow to the brake cylinder and apply the brake, while any reduction of auxiliary reservoir pressure which may occur by reason of this application will be replenished by the air from the train pipe.

Under ordinary conditions, the springs 44 bearing against the stem 17 will prevent the movement of the valve beyond the brake release position, but where this excess pressure is admitted to the train pipe, the resistance of the springs is overcome and the valve moves for the purpose of allowing the serial connection before described.

It will be noted that the valve is perfectly balanced and cannot be in any manner affected by the pressure of the air, so that there is but little frictional wear and no necessity for frequent regrinding of the valves or seats as in the ordinary triple valve.

In some cases, the valve may be provided with packing rings, disposed one near each end of the valve, and a third in alinement with the partition 43, although a sufficiently close fit may be made to avoid the necessity of using these packing rings.

I claim:—

1. In air brake systems, the combination with an auxiliary reservoir, a brake cylinder, and a train pipe, of a valve casing connected at one end to the auxiliary reservoir, and at the opposite end to the train pipe, said casing having an exhaust port, and being provided with ports in communication with the brake cylinder and the auxiliary reservoir, a valve mounted within the casing and having non-communicating bored or chambered ends, and separate ports leading through said valve and arranged to be moved into alinement with the various casing ports, said valve being movable under variations in train pipe pressure.

2. In air brake systems, the combination with an auxiliary reservoir, a brake cylinder, and train pipe, of a valve casing having one end communicating with the auxiliary reservoir and the other end with the train pipe, a brake cylinder exhaust port extending through the casing, additional ports extending through the casing and communicating with the auxiliary reservoir and brake cylinder, and a valve mounted in the casing and movable under variations in train pipe pressure, said valve having ports movable into alinement with the casing ports for controlling the various braking operations.

3. In an air brake system, the combination with an auxiliary reservoir, a brake cylinder, and train pipe, of a casing having one end communicating with the auxiliary reservoir, and the other end with the train pipe, a chamber connected to the casing and to the brake cylinder, a pair of ports leading from the chamber through the casing, one of said ports forming a feed from the auxiliary reservoir to the brake cylinder, and the other the exhaust from the brake cylinder, a second chamber connected to the casing and to the auxiliary reservoir, there being an auxiliary reservoir feed port for placing said chamber in communication with the interior of the casing, a valve mounted in the casing and having non-communicating chambered ends, an exhaust cavity formed in the valve and arranged to place the brake cylinder exhaust port in communication with the outer air, a port leading through the valve and arranged to establish communication between the auxiliary reservoir and the brake cylinder, and ports leading through the valve from the train pipe end thereof, one of said ports being normally in communication with the auxiliary reservoir port when the brakes are in release position, and the other forming a recharging port through which the supply of air in the auxiliary reservoir may be replenished while the brakes are set.

4. In an air brake system, the combination with an auxiliary reservoir, a brake cylinder, and a train pipe, of a valve casing, one end of which communicates with the auxiliary reservoir, and the other with the train pipe, a pair of chambers mounted on the casing and connected to each other and to the brake cylinder, ports for placing said chambers in communication with the interior of the casing, a third chamber mounted on the casing and having ported communication therewith, said casing being connected to the auxiliary reservoir, and a ported valve arranged in the casing and having non-communicating chambered ends, the valve ports being movable by variations in train-pipe pressure to establish communication between the auxiliary reservoir and the brake cylinder; to recharge the auxiliary reservoir while the brakes are set; and to place both the train pipe and the auxiliary reservoir in communication with the brake cylinder on an emergency reduction in said train pipe.

5. In an air brake system, an auxiliary reservoir, a brake cylinder, and a train pipe, a valve casing having one end in communication with the auxiliary reservoir and the other end with the train pipe, a plurality of sets of ports spaced from each other, and disposed in parallel relation with the axis of the casing, one port of each set being in communication with the brake cylinder, two of the ports of adjacent sets being in communication with the auxiliary reservoir, and one of the ports of one set being, also, in communication with the brake cylinder, and a valve arranged in the casing and provided with non-communicating chambered ends, said valve having ports arranged in sets corresponding to those of the casing, the valve being movable under variations in train pipe pressure to open or close the ports of one set to the exclusion of the others.

6. In an air brake system, the combination with an auxiliary reservoir, a brake cylinder, a train pipe, of a valve casing, one end of which communicates with the train pipe and the other end with the auxiliary reservoir, said casing having an auxiliary reservoir port, and a train pipe port, both of which communicate with the brake cylinder and are arranged to be opened on an emergency reduction for the passage of air from both the auxiliary reservoir and the train pipe to the brake cylinder, a controlling valve arranged in the casing and movable under variations in train pipe pressure, and a valve in the train pipe port, said valve being arranged to open under train pipe pressure and to close under pressure in the reverse direction.

7. In an air brake system, an auxiliary reservoir, a brake cylinder, a train pipe, a valve casing having one end in communication with the auxiliary reservoir, and the other end with the train pipe, ports leading from the casing to the brake cylinder, an auxiliary reservoir, a valve arranged within the casing and provided with non-communicating chambered ends, said valve having auxiliary reservoir ports, and a plurality of train pipe ports, either of which may be moved to establish communication between the train pipe and the auxiliary reservoir, one of said ports being normally in communication with the auxiliary reservoir when the brakes are in release position, and the other serving to permit recharging of the auxiliary reservoir while the brakes are set.

8. In an air brake system, an auxiliary reservoir, a brake cylinder, a train pipe, and a fluid pressure controlled valve operable under excess train pipe pressure for serially connecting the train pipe, and auxiliary reservoir, and the brake cylinder in the order named.

9. In an air brake system, an auxiliary reservoir, a brake cylinder, a train pipe, and a valve movable under the usual service and emergency reductions in train pipe pressure for the purpose of applying and releasing the brakes, said valve being provided with auxiliary ports, and being movable under excess train pipe pressure to establish through such ports a serial connection between the train pipe, the auxiliary reservoir and the brake cylinder in the order named.

10. In a valve mechanism for air brake systems, a valve casing having connections at its opposite ends for the train pipe and auxiliary reservoir, and provided with a plurality of ports, a valve slidably mounted in said cylindrical casing, the opposite ends of the valve being bored out toward a central partition that prevents communication between the two ends of the cylinder, ports extending from the bores to the periphery of the valve and arranged to move into and out of alinement with the casing ports, a hollow stem extending inward from the auxiliary reservoir end of the cylinder and entering the adjacent bore of the valve, and springs secured to the wall of the bore and engaging said stem, said springs tending to prevent movement of the valve beyond a normal brake release position and yielding to permit movement of the valve under excess train pipe pressure.

In testimony that I claim the foregoing as my own, I have hereto affixed my signature in the presence of two witnesses.

WILLIAM A. WEANT.

Witnesses:
T. L. KELLY,
J. F. MOORE.